United States Patent
Nishimura

(10) Patent No.: US 7,785,503 B2
(45) Date of Patent: Aug. 31, 2010

(54) OPTICAL FILM AND PROCESS FOR PRODUCING THE SAME

(75) Inventor: Koichi Nishimura, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 12/021,984

(22) Filed: Jan. 29, 2008

(65) Prior Publication Data
US 2008/0160223 A1   Jul. 3, 2008

Related U.S. Application Data

(62) Division of application No. 10/508,828, filed as application No. PCT/JP03/03506 on Mar. 24, 2003, now abandoned.

(30) Foreign Application Priority Data

Mar. 25, 2002 (JP) .............................. 2002-083935

(51) Int. Cl.
B29D 11/00 (2006.01)
(52) U.S. Cl. ...................................... 264/1.34; 264/1.6
(58) Field of Classification Search ................. 264/1.1, 264/1.6, 1.34, 2.6, 2.7
See application file for complete search history.

(56) References Cited

U.S. PATENT DOCUMENTS

| | | | |
|---|---|---|---|
| 3,471,594 A | 10/1969 | Kawamura et al. | |
| 5,516,456 A | 5/1996 | Shinohara et al. | |
| 5,528,400 A | 6/1996 | Arakawa et al. | |
| 5,543,948 A | 8/1996 | Takahashi et al. | |
| 6,277,474 B1 * | 8/2001 | Murschall et al. | ........ 428/195.1 |
| 6,411,344 B2 | 6/2002 | Fujii et al. | |
| 6,542,300 B2 | 4/2003 | Umemoto et al. | |
| 6,582,789 B1 | 6/2003 | Sumi et al. | |
| 6,667,787 B2 | 12/2003 | Umemoto et al. | |
| 6,731,357 B1 | 5/2004 | Tachibana et al. | |

(Continued)

FOREIGN PATENT DOCUMENTS

JP      60-214923 A     10/1985

(Continued)

OTHER PUBLICATIONS

Database WPI Week 199848, Thomson Scientific, London, GB; AN 1998-561936, XP-002573522, Abstract.

(Continued)

*Primary Examiner*—Mathieu D. Vargot
(74) *Attorney, Agent, or Firm*—Birch, Stewart, Kolasch & Birch, LLP

(57) ABSTRACT

An optical film composed of a thermoplastic resin film obtained by using a melt extruding machine, characterized in that said thermoplastic resin film satisfies a relation of the formula below over the whole surface of the film when an angle made by the extruding direction of the thermoplastic resin film from the melt extruding machine and a slow phase axis at each point is $\alpha$, and a retardation amount at each point is Re, is provided. $[\sin^2 2\alpha] \times [\sin^2(\pi \cdot Re/550)] \leq 4.0 \times 10^{-5}$. According to the present invention, an optical film wherein there is no problem on a residual solvent, optical distortion is small, and there is no problem of color unevenness and color absence of a liquid crystal display obtained by using the optical film as a protective film of a polarizer is provided.

7 Claims, 1 Drawing Sheet

U.S. PATENT DOCUMENTS

| | | |
|---|---|---|
| 6,803,411 B2 | 10/2004 | Harita et al. |
| 6,808,811 B1 | 10/2004 | Sawada et al. |
| 6,961,180 B2 | 11/2005 | Umemoto et al. |
| 6,964,814 B2 | 11/2005 | Fujii et al. |
| 2002/0018883 A1 | 2/2002 | Okazaki et al. |
| 2003/0031848 A1 | 2/2003 | Sawada et al. |
| 2003/0138654 A1 | 7/2003 | Kido et al. |

FOREIGN PATENT DOCUMENTS

| | | |
|---|---|---|
| JP | 6-51117 A | 2/1994 |
| JP | 10-249909 A | 9/1998 |
| JP | 2000-273204 A | 10/2000 |
| JP | 2001-337221 A | 12/2001 |
| JP | 2002-321302 A | 11/2002 |
| JP | 2003-185844 A | 7/2003 |
| WO | WO-93-02381 A1 | 2/1993 |
| WO | WO 96/38498 | * 12/1996 |
| WO | 01/81957 A1 | 11/2001 |

OTHER PUBLICATIONS

Database WPI Week 200223, Thomson Scientific, London, GB; AN 2002-179343, XP-002573782, Abstract.

European Search Report issued Mar. 30, 2010 for corresponding European Application No. 03712844.4.

* cited by examiner

OPTICAL FILM AND PROCESS FOR PRODUCING THE SAME

CROSS-REFERENCE TO RELATED APPLICATIONS

The present application is a divisional of, and claims priority under 35 U.S.C. §120 to, U.S. application Ser. No. 10/508,828 filed Nov. 9, 2004, now abandoned which in turn is the U.S. national phase of International Application No. PCT/JP03/03506 filed Mar. 24, 2003. Priority is claimed under 35 U.S.C. §119 to Japanese Application No. 2002-83935 filed on Mar. 25, 2002. The entire contents of each are hereby incorporated by reference.

TECHNICAL FIELD OF THE INVENTION

The present invention relates to an optical film suitably used as a variety of films used in a flat panel display, etc. and a raw material film thereof, a production method of the optical film, a protective film of a polarizer composed of the optical film, a polarizing film having the protective film and a phase difference film obtained by performing stretch processing on the optical film.

BACKGROUND ART

In a liquid crystal display and other flat panel displays, a phase plate, a polarizing plate and a liquid crystal cell substrate, etc. configured by including a thermoplastic resin film are used. As the phase plate, those obtained by stretching a raw material film, such as polycarbonate, giving a certain amount of retardation (also referred to as a phase difference) thereto, and putting two or more of them together are mainly used.

As the polarizing plate, those obtained by stacking a protective film on an upper surface and a lower surface of a polarizer made by polyvinyl alcohol are mainly used. As the protective film of a polarizer, a film obtained by a solution casting method of triacetyl cellulose is mainly used. As the liquid crystal substrate film, a film made by polyethylene terephthalate (PET) is mainly used.

Along with a recent flat panel display becoming larger, thinner and finer and to have an increased contrast, the above various thermoplastic resin films have been required to have highly less optical distortion than those in the conventional ones. It is because when the optical distortion is large, optical defects, such as color unevenness and color absence, etc., allover the flat panel display are caused.

Conventionally, as an index for indicating optical distortion of various thermoplastic resin films, an amount of retardation has been mainly used. By making the value of the retardation amount small or a predetermined value and uniform on a plane, an effort to diminish the optical distortion has been made. For example, in a polarizer protective film, having a small and constant retardation amount allover the film has been its index.

An optical film made by a thermoplastic resin wherein a retardation amount is small and constant allover the film has been proposed.

As a polarizer protective film, conventionally, a film made by a solution casting method of triacetyl cellulose (TAC) has been mainly used. A solution casting method film of TAC has a relatively small retardation being relatively constant on a film surface. However, there are disadvantages that it is poor in productivity, a solvent cannot be completely removed at the time of drying after the solution casting, and an emitted solvent gives an adverse effect on an electronic circuit and other parts of the flat panel display to cause an erroneous operation and display defective, etc.

Therefore, recently, as a protective film, a film obtained by a melt extrusion method of a thermoplastic resin has been studied as substitute for the film by a solution casting method of TAC. For example, the Japanese Unexamined Patent Publication No. 2000-273204 discloses a technique of obtaining a sheet having a sheet thickness of 150 to 1000 µm, in-plane thickness tolerance (Rmax) on the sheet of 15 µm, roughness of the sheet surface of 0.06 µm, and a retardation amount (maximum value) on the sheet surface of 15 nm, wherein a retardation amount is relatively constant and relatively small by performing melt extrusion molding on a specific thermoplastic resin under a specific condition.

However, the technique disclosed in the publication is for a thick sheet of 150 µm or more, generally, the thinner the sheet thickness becomes, the larger the thickness unevenness tends to be comparing with the thickness, and optical distortion becomes worse. Therefore, there has been a problem that it was impossible to respond to a recent demand for a thinner flat display.

Also, in the technique disclosed in the publication, there was a problem that a maximum value of an in-plane retardation amount was as much as 15 nm, which caused large optical distortion, so that it was impossible to respond to required performance of a flat panel display with still higher performance.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and wherein:

The FIGURE generically shows a protective film of the present invention.

DISCLOSURE OF THE INVENTION

Figure 1:
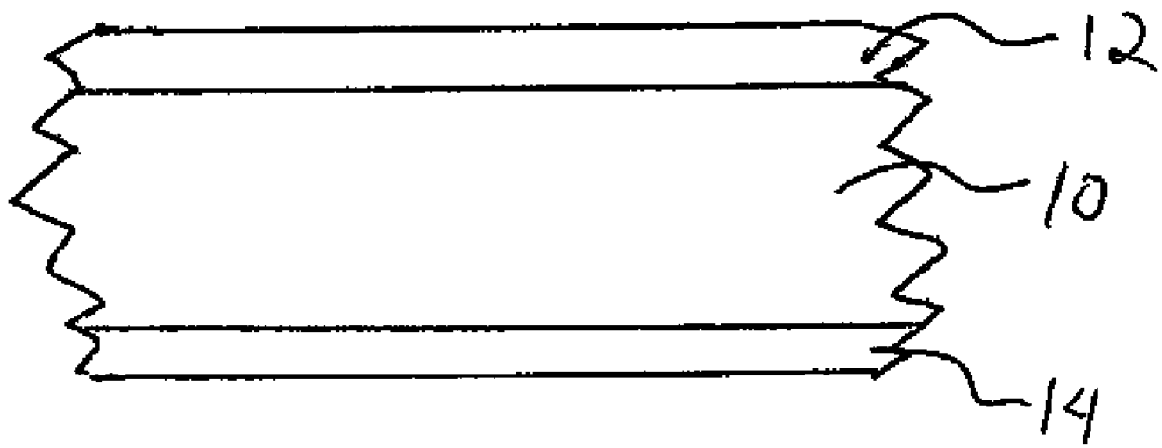

An object of the present invention is to provide an optical film having no residual solvent problem, small optical distortion, and no problem of color unevenness and color absence of a liquid display to be obtained when used as a polarizer protective film, a process for producing the optical film, a polarizer protective film configured by the optical film, a polarizing film having the protective film, and a phase difference film with small optical distortion obtained by performing stretch processing on the optical film.

The present inventors have been committed themselves to study for solving the above problems, consequently, found a technique of making a retardation amount (Re) of an optical film to be obtained to be 10 nm or less by optimizing a melt extrusion condition and an operation condition of cooling drums, and completed as another invention.

When the maximum value of Re becomes 0 nm, it means there is no in-plane optical distortion. However, even by using such a technique, the maximum value of Re is hardly made to be a certain level or less and there is a limit. Thus, the present inventors focused not only on the Re value but on the direction of a slow phase axis indicating directivity. At each point, the direction that birefringent becomes maximum is referred to as a slow phase axis, and the direction that the birefringent becomes minimum is referred to as a fast phase axis.

The present inventors found that it is more important to control Re in a relation of an angle α made by the slow phase axis and the extruding direction of a thermoplastic resin than to only focus on Re to diminish it; a Z value expressed by "$Z=[\sin^2 2\alpha]\times[\sin^2(\pi\cdot Re/550)]$" is suitable as the index; while it is preferable that the Z value is small, color unevenness and color absence of a liquid crystal display to be obtained largely change on a boundary of $6.0\times10^{-3}$, and when being at this value or smaller, it is possible to respond to the recent high demands for a liquid crystal display. The present invention was completed based on the knowledge.

Namely, according to the present invention, there is provided an optical film composed of a thermoplastic resin film obtained by using a melt extruding machine, characterized in that said thermoplastic resin film satisfies a relation of the formula below over the whole surface of the film when an angle made by the extruding direction of the thermoplastic resin film from the melt extruding machine and a slow phase axis at each point is α, and a retardation amount at each point is Re.

$$[\sin^2 2\alpha]\times[\sin^2(\pi\cdot Re/550)]\leq 4.0\times10^{-5}$$

Preferably, a value of said Re is 10 nm or less.

Preferably, said thermoplastic resin is an alicyclic structure containing polymer.

The optical film according to the present invention is preferably produced, for example, by a production method below.

Namely, according to an example of the present invention, there is provided a production method of an optical film composed of a thermoplastic resin film, including a step of cooling a molten thermoplastic resin extruded from an extruding machine by making it successively circumscribed with a first cooling drum, a second cooling drum and a third cooling drum:

wherein, when assuming that rotation speed of said third cooling drum is $R_3$ (m/min.), and rotation speed of said second cooling drum is $R_2$ (m/min.), a ratio of the $R_3$ and $R_2$ ($R_3/R_2$) is made to be 0.990 or more but less than 0.999 to cool said thermoplastic resin.

In the production method, it is preferable that, when assuming a resin contact time in said first cooling drum is $t_1$ (sec.), a temperature when said thermoplastic resin moves away from said first cooling drum is $Tp_1$ (° C.), and a glass transition temperature of said thermoplastic resin is Tg (° C.), $t_1\times(Tp_1-Tg)$ (unit: sec.·deg) is made to be −50 or higher and 20 or lower to cool said thermoplastic resin.

In the production method, it is preferable that, when assuming that rotation speed of said first cooling drum is $R_1$ (m/min.), a ratio of the $R_2$ and $R_1$ ($R_2/R_1$) is made to be 0.990 or more but less than 1.01 to cool said thermoplastic resin.

In the production method, it is preferable that, when assuming that a temperature when said thermoplastic resin moves away from said third cooling drum is $Tp_3$ (° C.), the $Tp_3$ is made to be a lower temperature than said Tg by 50 to 100° C. to cool said thermoplastic resin.

In the production method, it is preferable that, when assuming that a temperature when said thermoplastic resin moves away from said second cooling drum is $Tp_2$ (° C.), the $Tp_2$ is made to be a lower temperature than said Tg by 0 to 60° C. to cool said thermoplastic resin.

In the production method, it is preferable that, a temperature difference of said first cooling drum and said second cooling drum is made to be 20° C. or less to cool said thermoplastic resin.

According to the present invention, there is provided a protective film of a polarizer composed of any one of the above optical films.

According to the present invention, there is provided a polarizing film having a polarizer 10 and the above protective film 12, 14 stacked on one surface or both surfaces of the polarizer via an adhesive layer as shown in the FIGURE. While two films 12, 14 are shown, it should be appreciated that only one film on either side may be used as noted above.

According to the present invention, there is provided a phase difference film obtained by performing stretch processing on any one of the above optical films.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODE FOR CARRYING OUT THE INVENTION

An optical film according to the present invention is configured by a thermoplastic resin film.

The thermoplastic resin film used in the present invention includes at least a thermoplastic resin.

The thermoplastic resin is not particularly limited as far as it is a resin normally used in producing an optical film. For example, polyethylene, polypropylene, an ethylene-propylene copolymer, polystyrene, polyacrylonitrile, an acrylonitrile-styrene copolymer, polyvinylchloride, polymethyl methacrylate, polyethylene terephthalate, polybutylene terephthalate, polycarbonate and an alicyclic structure containing polymer, etc. may be mentioned. Among them, because of high transparency and excellent film strength, polyethylene terephthalate, polybutylene terephthalate and an alicyclic structure containing polymer are preferable and, furthermore, an alicyclic structure containing polymer is particularly preferable because a phase difference is easily made small.

An alicyclic structure containing polymer is a polymer having a cyclic structure made by carbon-carbon saturated bonds (referred to as "an alicyclic structure" in the present invention) in a repeat unit and, for example, a well-known polymer disclosed in the Japanese Unexamined Patent Publication No. 2002-321302 may be used. For example, ring-opened polymers and the hydrogenated products of monomers having a norbornene ring (hereinafter, referred to as "norbornene"), addition polymers of norbornene and the hydrogenated products, addition copolymers of norbornene and a vinyl compound and the hydrogenated products; polymers obtained by hydrogenating aromatic ring of a polymer of polystyrene or other aromatic vinyl hydrocarbon compounds, addition polymers of monomers having an alicyclic structure and a vinyl group, addition polymers of monomers having one or more unsaturated bonds in a carbon-carbon cyclic structure and the hydrogenated products, etc. may be mentioned.

The thermoplastic resin film used in the present invention may be blended with a variety of compounding agents in accordance with need other than the above thermoplastic resins. The compounding agents are not particularly limited. For example, antioxidants, heat stabilizers, light stabilizers, weather resistant stabilizers, ultraviolet ray absorbents, near infrared ray absorbents and other stabilizers; lubricants, plasticizers and other resin improvers; colorants, pigments and other coloring agents; antistatic agents, etc. may be mentioned. These compounding agents may be used alone or in combination of two or more kinds. A blending quantity of these compounding agents is suitably selected in a range of not hindering the objects of the present invention.

As antioxidants, phenol based antioxidants, phosphorus based antioxidants, and sulfur based antioxidants, etc. may be mentioned. Among these, phenol based antioxidants are preferable and alkyl-substituted phenol based antioxidants are particularly preferable. By including an antioxidant, coloring and strength decline due to deterioration by oxidization, etc. at the time of molding a molded product (a thermoplastic resin film) can be prevented without deteriorating transparency and a low water absorbing property of a thermoplastic resin film after melt extrusion molding, which will be explained later on. The antioxidants may be used alone or in combination of two or more kinds. A blending quantity of antioxidants is suitably selected in a range of not hindering the object of the present invention. Normally, it is 0.001 to 5 parts by weight or so and preferably 0.01 to 1 part by weight with respect to 100 parts by weight of a thermoplastic resin.

The thermoplastic resin film used in the present invention is produced by performing melt extrusion molding on a molding material including at least a thermoplastic resin. Specifically, first, a molding material is obtained by, for example, mixing a thermoplastic resin and a variety of compounding agents. Next, the molding material is processed to be material pellets suitable for melt extrusion molding. Next, the material pellets are supplied to a melt extruding machine and processed to be a film shape by a melt extrusion method to obtain a thermoplastic resin film. The melt extrusion method is a method of heating and melting the material pellets in a cylinder, applying pressure by a screw, and extruding from a die, such as T-die, to be, for example, a film shape. Normally, a thermoplastic resin in a molten state extruded from a die is successively transferred by being circumscribed with a plurality of cooling drums, cooled during that time, then, subjected to necessary steps to be a thermoplastic resin film. A width of the thermoplastic resin film after passing through the cooling drums becomes narrower by 2 to 10% due to neck-in comparing with a width of a molten thermoplastic resin immediately after being extruded from a die (same as a width of a lip of the die). An end of the thermoplastic resin film in the width direction (hereinafter, also simply referred to as "an end") has a thicker thickness and larger optical distortion comparing with those on other parts of the film.

In the present invention, since the thermoplastic resin film after cooling is for an optical use, normally, sides thereof are suitably cut off before winding with a wind drum. The cut off parts will be called "selvage" in the present invention. A part of the cooled thermoplastic resin film yet to be stretched after removing parts to be the selvage will be referred to as "an optical film" in the present invention. As in a protective film and a liquid crystal substrate, etc., when used in a state that a retardation amount is nearly zero, selvage is removed from the thermoplastic resin film yet to be stretched, the optical film is taken out and wound by a wind drum.

The thermoplastic resin film used in the present invention is made to be an optical film, wound to be a roll shape by a wind drum, then, it may be subjected to the next step: a stretch step and an adhesion step to other film, etc. to be value-added.

An average thickness of the thermoplastic resin film used in the present invention is not particularly limited. To make an optical film taken out from the thermoplastic resin film used in the present invention suitable to a thin flat panel display, etc., it is preferable that an average thickness of the thermoplastic resin film is made to be normally 100 μm or less, preferably 80 μm or less, particularly preferably 60 μm or less. An average thickness of the thermoplastic resin film can be freely set by changing a feeding speed of the material pellets fed to the melt extrusion machine or a rotation speed of the cooling drum or the both, etc.

The thermoplastic resin film used in the present invention satisfies the relation of the formula below on the whole surface of the film when assuming that an angle made by the extruding direction from the melt extrusion machine and a slow phase axis at each point is α, and a retardation amount at each point is Re.

$$[\sin^2 2\alpha] \times [\sin^2(\pi \cdot Re/550)] \leq 4.0 \times 10^{-5}$$

In the present invention, the left side of the equation $[\sin^2 2\alpha] \times [\sin^2(\pi \cdot Re/550)]$ is referred to as a Z value. The Z value is an amount corresponding to light leakage caused by retardation of the optical film. Linear polarization cannot transmit a polarizer having an absorption axis perpendicular to the light axis. However, when the linear polarization transmits the optical film with optical distortion (retardation is not zero), a phase delays in the slow phase axis direction of the optical film, and a part of the linear polarization can transmit the polarizer. When a part of linear polarization transmits the polarizer, color unevenness and color absence are caused in a liquid crystal display using the optical film.

In the above formula, as a wavelength of linear polarization, 550 nm which is a center wavelength of visible light is applied, and α is normally defined as an angle made by a slow phase axis of the film and a light axis of linear polarization. However, when conducting a test of performance of an optical film alone, α cannot be defined. Therefore, the present inventors focused on an angle made by the extruding direction of the thermoplastic resin film to be an optical film from the melt extruding machine and a slow phase axis at each point, and used the same as α to define a Z value for an alternative characteristic.

In recent years, as liquid crystal displays become larger, long optical films in roll shape, etc. are put together or such an optical film is put together with other long film to obtain a stacked body in many cases. Thus, defining α in relation with the longitudinal direction (same as the extruding direction from the melt extruding machine) of the stacked body is considered advantageous for managing quality of the optical film alone.

Values of Re and α at each point as explained above can be measured by using a phase difference meter, etc., and a Z-value can be obtained from the values.

A maximum value of the Z value can be obtained by measuring over a suitable longitudinal length and measuring points including a part close to an end of the optical film in the width direction. The value can be applied as a substitute value. The maximum value of the Z value is normally required to be $4.0 \times 10^{-5}$, preferably $3.8 \times 10^{-5}$, and furthermore preferably $3.4 \times 10^{-5}$. When the Z value is a predetermined value or less, a problem of color unevenness and color absence of a liquid crystal display to be obtained becomes furthermore smaller, and color unevenness and color absence are not visually sensed, so that the display quality is remarkably improved, which is preferable.

In the present invention, the maximum value of Re is not particularly limited. However, Re over whole surface of the film is preferably 10 nm or less, more preferably 7 nm or less, and furthermore preferably 5 nm or less. When the Re value is a predetermined value or less, a problem of color unevenness and color absence of a liquid crystal display to be obtained becomes furthermore smaller. Also, color unevenness and color absence after a durability test become furthermore smaller, which is preferable.

The Re value can be measured by an optical method, such as an ellipsometer. As the maximum value of Re, a value obtained by measuring over a suitable longitudinal length and measuring points including a part close to an end of the optical film in the width direction can be applied as a substitute value.

A method of producing an optical film according to the present invention which satisfies the above conditions is not particularly limited. For example, a method of increasing a ratio of the selvage part to the whole film so as to satisfy the above conditions on the whole surface of the film may be mentioned. The ratio of the selvage part in this case is normally 3% or more on the right and the left, preferably 5% or more on the right and the left, particularly preferably 7% or more on the right and the left, preferably 40% or less on the right and the left, and particularly preferably 20% or less on the right and the left. Other than that, an optical film of the present invention can be also produced by optimizing the conditions from melt extrusion to winding of the thermoplastic resin film.

Below, an example of a preferable production method of the optical film according to the present invention will be explained.

A production method of an optical film according to the present invention includes a step of cooling a molten thermoplastic resin extruded from an extruding machine by making it circumscribed with a first cooling drum, second cooling drum and third cooling drum successively. After that, more preferably, a step of cutting both end portions in the width direction of the cooled thermoplastic resin, and a step of winding the cut thermoplastic resin in a roll shape are included.

Here, in the cooling step, the thermoplastic resin is cooled to satisfy preferably at least any one of (1) to (6) below, more preferably at least (1) and (2) below, and particularly preferably all of (1) to (6) below.

(1) When assuming that rotation speed of the third cooling drum is $R_3$ (m/min.) and rotation speed of the second cooling drum is $R_2$ (m/min.), the ratio of the $R_3$ and $R_2$ ($R_3/R_2$) is made to be preferably 0.990 or more but less than 0.999, and more preferably 0.995 or more but less than 0.998 to cool the thermoplastic resin. When the value of $R_3/R_2$ is excessively large, a molten thermoplastic resin extruded from the extruding machine (hereinafter, also referred to as "a sheet thermoplastic resin") is stretched and a retardation amount and the unevenness become large, which is not preferable. On the other hand, when the value of $R_3/R_2$ is excessively small, the sheet thermoplastic resin becomes slack and droops, the weight becomes tension to stretch the sheet thermoplastic resin, and a retardation amount and the unevenness become large, which is also unfavorable. To determine a set value of $R_3/R_2$, the resin temperature is set to be appropriate for a contraction percentage of the resin caused by a temperature decline from around the second cooling drum temperature to around the third cooling drum temperature when transferring the sheet thermoplastic resin from the second cooling drum to the third cooling drum. When the above rotation speed ratio is applied, it is possible to produce a thermoplastic resin film with a small and uniform retardation as a result that the sheet thermoplastic resin does not become slack and is stretched with a suitable tension.

(2) When assuming that a resin contact time in the first cooling drum is $t_1$ (sec.), a temperature when the thermoplastic resin moves away from the first cooling drum is $Tp_1$ (° C.), and a glass transition temperature of the thermoplastic resin is Tg (° C.), $t_1 \times (Tp_1 - Tg)$ (unit: sec.·deg) is made to be preferably −50 or higher and 20 or lower, and more preferably −40 or higher and +15 or lower to cool the thermoplastic resin. When the value of $t_1 \times (Tp_1 - Tg)$ is in the ranges, uniformity of a thickness of an optical film to be obtained $Dr/D_{ave}$ becomes small, and the maximum value of Re becomes small, so that the optical film of the present invention can be easily obtained.

(3) When assuming that rotation speed of the first cooling drum is $R_1$ (m/min.), the ratio of $R_2$ and $R_1$ ($R_2/R_1$) is preferably set to 0.990 or more but less than 1.01, and more preferably 0.995 or more but less than 1.000 to cool the thermoplastic resin. When the value of $R_2/R_1$ is in the ranges, unevenness of a retardation amount of an optical film to be obtained becomes particularly small, and wrinkles when winding is hard to arise.

(4) When assuming that a temperature when the thermoplastic resin moves away from the third cooling drum is $Tp_3$ (° C.), the $Tp_3$ is set to be lower than the above Tg preferably by 50 to 100° C., and more preferably by 60 to 80° C. to cool the thermoplastic resin. When the value of the $Tp_3$ is in the ranges, unevenness of a retardation amount of an optical film to be obtained becomes particularly small, and wrinkles when winding is hard to arise. To make the temperature $Tp_3$ in the above ranges, it is sufficient to control the temperature of the third cooling drum and the second cooling drum.

(5) When assuming that the temperature when the thermoplastic resin moves away from the second cooling drum is $Tp_2$ (° C.), the $Tp_2$ is set to be lower than the above Tg preferably by 0 to 60° C., and more preferably by 20 to 40° C. to cool the thermoplastic resin. When the value of the $Tp_2$ is in the ranges, unevenness of a retardation amount of an optical film to be obtained becomes particularly small, and wrinkles when winding is hard to arise.

(6) A temperature difference of the first cooling drum and the second cooling drum is made to be preferably 20° C. or less, and more preferably 10° C. or less to cool the thermoplastic resin. By cooling by maintaining the temperature difference of the two to be 20° C. or less, the maximum value of retardation can be made small and display unevenness can be reduced.

The optical film according to the present invention is suitable as a protective film of a polarizer of a liquid crystal display. The polarizer is obtained by performing stretch processing after doping with iodine on a film made by a vinyl alcohol based polymer, such as polyvinyl alcohol and partially formalization polyvinyl alcohol.

To protect the polarizer, the optical film of the present invention is staked as a protective film on one surface or both surfaces of the polarizer via a suitable adhesive layer, so that a polarizing film can be obtained. As the adhesive layer, an adhesive agent, etc. wherein a suitable polymer is a base polymer, such as an acryl based polymer, a silicon based polymer, polyester, polyurethane, polyether, and synthetic rubber is used.

The optical film of the present invention is suitable to a material for producing a polarizing film as a protective film by putting the longitudinal direction together with the longitudinal direction of a long polarizer (referred to as roll-to-roll), and adhering to stack.

The optical film of the present invention may be furthermore subjected to stretch processing to obtain a phase difference film. A phase difference film is a film having a uniform retardation amount of a predetermined value over the whole surface of the phase difference film. There are phase difference films of λ/2 and λ/4, etc. of a light wavelength λ to be used. For example, a tenter is used for performing stretch processing on the optical film of the present invention. A film temperature during stretching is, for example, (Tg−100)° C. or higher and (Tg+40)° C. or lower. Here, Tg is a glass transition temperature of a thermoplastic resin to be a material. Also, while the stretching ratio depends on a retardation value to be obtained and a thickness of the phase difference film, it is normally 1.05 times or more and 3.0 times or less in the length direction (extruding direction of the thermoplastic resin film) and 0.2 times or less in the width direction, or may be uniaxially stretched in the length direction.

EXAMPLES

Below, the present invention will be explained more in detail by taking examples and comparative examples. "Part" and "%" in the examples are based on weight unless otherwise mentioned.

Preparation of various samples and tests were performed as below.

(1) Average Thickness $D_{ave}$ of Film:

By using a contact type film thickness meter, film thickness was obtained by measuring at every 500 mm over 10 m in the film length direction (20 points) and at 5 points at regular intervals in the width direction (unit: μm).

(2) α Re and Z value and Maximum Values of Re and Z Value:

By using a phase difference measuring device (KOBRA-21ADH made by Oji Scientific Instruments), α and Re (unit: nm) were measured at every 500 mm over 10 m in the film length direction (20 points) and at 5 points at regular intervals in the width direction, a Z value was calculated from the results, and the maximum values of Re and Z value were obtained from the values. A measurement wavelength was set to be 550 nm and an incident angle was 0°.

(3) Whole Light Transmittance:

As a simple test of color unevenness when using an optical film obtained in the present experiment in a flat panel display, the whole light transmittance of the optical film was measured by the cross Nicole method based on JIS-K7105, and the average value was obtained (unit: %). The value is ideally 0, but preferable when 0.03% or less and defective when 0.04% or more.

(4) Color Unevenness:

Color unevenness and color absence which become a problem when used as a protective film of a polarizer were tested simply. The configuration of a liquid crystal display on market normally is that both surfaces of the polarizer are sandwiched by two protective films to obtain a polarizing plate, furthermore, both surfaces of the liquid crystal are (via other necessary layers) sandwiched by two polarizing plates. When there is optical distortion on the protective film, color unevenness and color absence allover the liquid crystal display are caused. Optical distortion of the optical film to be each protective film was tested simply as below. By preparing two polarizers on market of liquid crystal polyvinyl alcohol doped with iodine, the two polarlizers were put together so that their polarizing axes were at right angles to each other, an optical film obtained in the experiment was sandwiched between them to obtain three-layer structure made by the polarizer/optical film/polarizer. Then, transmittance degree of an unpolarized light (natural light) was visually observed. In the present invention, an angle made with the length direction (the extruding direction of the thermoplastic resin film from a melt extruding machine) was defined as α and used as an alternative characteristic. Therefore, to confirm in other directions, leakage of the light was observed in respective directions on the film at respective measuring points by rotating the polarizer. Those with no light leakage observed were marked ⊚, those hardly observed were o, those observed little were Δ, those clearly observed were x. The measurement points in the present invention were at every 500 mm over 10 m in the film length direction and at 10 points at regular intervals in the width direction.

(5) Simple Liquid Crystal Display Test:

Color unevenness and color absence which become a problem when used as a protective film of a polarizer were tested simply by using an actual liquid crystal display. A polarizing film was peeled from a liquid crystal cell very carefully on a display portion of a cellular phone on market (black and white two-graduation display, reflection type, a display area of 30 mm×30 mm), and a polarizing film produced by using the optical film of the present invention was stacked as a protective film on both surfaces of the polarizer to produce a test liquid crystal display. A part close to the end of the optical film in the width direction was used as a sample piece, and 10 mass % of polyvinyl alcohol solution was used for stacking. The above test liquid crystal display was produced for each experiment example, a variety of characters and still images were displayed, and observed from viewable angles of 0° and 30° to visually observe existence of color unevenness and color absence (a part where a proper color is not displayed). Those at an approvable level were marked o, defectives were marked x, and those in the middle and not at an approvable level were marked Δ.

(6) Color Unevenness After Durability Test:

A test piece of 1000 mm×1000 mm was cut from the obtained optical film, and a high temperature high humidity durability promotion test at 80° C. and 90% RH for 100 hours was conducted thereon. After that, the same color unevenness test as that in (4) was conducted on the taken out test piece.

Example 1

In a nitride atmosphere, 500 parts of dehydrated cyclohexane was mixed with 0.82 part of 1-hexene, 0.15 part of dibutylether and 0.3 part of triisobutyl aluminum in a reactor at the room temperature, then, while being kept at 45° C., a monomer mixture composed of 70 parts of tricyclo[4.3.0.1$^{2,5}$]deca-3,7 diene (dicyclopentadiene, DCP), 70 parts of tetracyclo [4.4.0.1$^{2,5}$.1$^{7,10}$]dodeca-3-ene (tetracyclo dodecene, TCD), and 60 parts of 8-ethylidene-tetracyclo[4.4.0.1$^{2,5}$.1$^{7,10}$] dodeca-3-ene (ethylidene tetracyclo dodecene, ETD); and 40 parts of tungsten hexachloride (0.7% toluene solution) were added continuously for two hours to bring polymerization. After that, the polymerized solution was added with 1.06 parts of butylglycidyl ether and 0.52 part of isopropyl alcohol to inactivate the polymerization catalyst and the polymerization reaction was stopped.

Next, 100 parts of the polymerization reaction solution containing an obtained ring-opened polymer was added with 270 parts of cyclohexane, furthermore, added with 5 parts of nickel-alumina catalyst (made by Nikki Chemical Co., Ltd.) as a hydrogenated catalyst, applied pressure of 5 MPa by hydrogen, and heated to a temperature of 200° C. while agitating to bring reaction for 4 hours. Consequently, a reaction solution containing 20% of a DCP/TCD/ETD ring-opened polymer hydrogenated polymer was obtained.

Next, after removing the hydrogenated catalyst from the solution by filtering, 0.1 part of a soft polymer (SEPTON2002 made by Kuraray Co., Ltd.) and 0.1 part of an antioxidant (IRGANOX made by Ciba Specialty Chemicals K. K.) with respect to 100 parts of the polymer were added to the obtained solution and dissolved.

Next, cyclohexane and other volatile components were removed from the solution by using a cylinder shaped concentrating and drying device (made by Hitachi Ltd.), a molten hydrogenated polymer was extruded to be a strand shape from an extruding machine, cooled and pelletized to obtain a ring-opened polymer hydrogenate. The hydrogenate had a glass transition temperature Tg of 140° C.

The obtained pellets are subjected to melt extrusion by a single-screw extrusion molding machine (made by Japan Steel Works Ltd.) having a cylinder inner diameter of 50 mm and a screw L/D value of 28 at a barrel temperature of 260° C., and a sheet molten resin having a width of 650 mm was extruded from a coat hunger die at a die temperature of 260° C. The result was made close to a first cooling drum (diameter of 200 mm, temperature $T_1$ of 135° C., rotation speed $R_1$ of 14.50 m/min.), immediately transferred by a knife coater from the first cooling drum, then, to a second cooling drum (diameter of 350 mm, temperature $T_2$ of 125° C., rotation speed $R_2$ of 14.46 m/min.), then, to a third cooling drum (diameter of 350 mm, temperature $T_3$ of 80° C., rotation speed $R_3$ of 14.40 m/min.) successively, and cooling and smoothing of the front and back surfaces by transferring the cool drum surfaces were sequentially performed to obtain a thermoplastic resin film having a width of 550 mm (the neck-in was 50 mm on the right and the left). The thermoplastic resin film passed through an adjustment drum, then, 30 mm was removed as selvage from both ends by a cutter, the result was wound in a roll shape by a wind drum, and a rolled optical film was obtained.

Note that a contact time $t_1$ of the sheet thermoplastic resin with the first cooling drum was 3.1 (seconds), a resin temperature $Tp_1$ when moving away from the first cooling drum was 132 (° C.), a resin temperature $Tp_2$ when moving away from the second cooling drum was 119 (° C.), and a resin temperature $Tp_3$ when moving away from the third cooling drum was 79 (° C.). $(R_3/R_2)=0.996$, $(R_2/R_1)=0.997$ and $(t_1 \times (Tp_1-Tg))=-25$ (unit: sec.·deg).

The above test items were conducted on the obtained optical film, and the results are shown in Table 1.

Example 2

Except for changing $T_1$ in the example 1 to 130° C., an optical film was produced in the same way as in the example 1. At this time, a contact time $t_1$ of a sheet thermoplastic resin with the first cooling drum was 3.1 (sec.), a resin temperature $Tp_1$ when moving away from the first cooling drum was 128 (° C.), a resin temperature $Tp_2$ when moving away from the second cooling drum was 121 (° C.), a resin temperature $Tp_3$ when moving away from the third cooling drum was 81 (° C.), and $t_1 \times (Tp_1-Tg)$ was −37 (unit: sec.·deg). Test results of an obtained optical film are shown in Table 1.

Example 3

Except for changing $T_1$ in the example 1 to 130° C. and $T_2$ to 120° C., an optical film was produced in the same way as in the example 1. At this time, a contact time $t_1$ of a sheet thermoplastic resin with the first cooling drum was 3.1 (sec.) a resin temperature $Tp_1$ when moving away from the first cooling drum was 128 (° C.), a resin temperature $Tp_2$ when moving away from the second cooling drum was 114 (° C.), a resin temperature $Tp_3$ when moving away from the third cooling drum was 77 (° C.), and $t_1 \times (Tp_1-Tg)$ was −37 (unit: sec.·deg). Test results of an obtained optical film are shown in Table 1.

Comparative Example 1

Except for changing $T_1$ in the example 1 to 140° C. and $T_2$ to 100° C., an optical film was produced in the same way as in the example 1. At this time, a contact time $t_1$ of a sheet thermoplastic resin with the first cooling drum was 3.1 (sec.), a resin temperature $Tp_1$ when moving away from the first cooling drum was 137 (° C.), a resin temperature $Tp_2$ when moving away from the second cooling drum was 96 (° C.), a resin temperature $Tp_3$ when moving away from the third cooling drum was 75 (° C.), and $t_1 \times (Tp_1-Tg)$ was −9 (unit: sec.·deg). Test results of an obtained optical film are shown in Table 1.

Comparative Example 2

Except for changing $T_1$ in the example 1 to 125° C., an optical film was produced in the same way as in the example 1. At this time, a contact time $t_1$ of a sheet thermoplastic resin with the first cooling drum was 3.1 (sec.), a resin temperature $Tp_1$ when moving away from the first cooling drum was 123 (° C.), a resin temperature $Tp_2$ when moving away from the second cooling drum was 117 (° C.), a resin temperature $Tp_3$ when moving away from the third cooling drum was 79 (° C.), and $t_1 \times (Tp_1-Tg)$ was −53 (unit: sec.·deg). Test results of an obtained optical film are shown in Table 1.

Comparative Example 3

Except for changing $T_1$ in the example 1 to 125° C. and $T_2$ to 20° C., an optical film was produced in the same way as in the example 1. At this time, a contact time $t_1$ of a sheet thermoplastic resin with the first cooling drum was 3.1 (sec.), a resin temperature $Tp_1$ when moving away from the first cooling drum was 123 (° C.), a resin temperature $Tp_2$ when moving away from the second cooling drum was 115 (° C.), a resin temperature $Tp_3$ when moving away from the third cooling drum was 76 (° C.), and $t_1 \times (Tp_1-Tg)$ was −53 (unit: sec.·deg). Test results of an obtained optical film are shown in Table 1.

Comparative Example 4

Except for changing the width of the selvage to 150 mm on the right and on the left, an optical film was produced in the same way as in the comparative example 2. Test results of an obtained optical film are shown in Table 1. This example shows a result of testing by obtaining an optical film satisfying the requirements of the present invention by changing a width of the selvage comparing with the case of the comparative example 2.

Note that various conditions at the time of producing a film are shown in Table 2.

TABLE 1

English translation of table 1 of Takahiko('211)

| | Film resin | Resin temperature in die part (°C.) | Temperature of the cooling role(° C.) | | | Stretching temperature (° C.) | $\Delta n/\sigma$ ($m^2/N$) | Re (nm) | Polarization degree (%) |
|---|---|---|---|---|---|---|---|---|---|
| | | | First role | Second role | Third role | | | | |
| Example 1 | Norbornene based resin - 1 | 250 | 140 | 120 | 100 | 150 | $2.1 \times 10^{-9}$ | 3.5~6.5 | 99.9 |
| Example 2 | Norbornene based resin - 2 | 290 | 175 | 150 | 130 | 175 | $1.3 \times 10^{-9}$ | 2.3~3.8 | 99.9 |
| Example 3 | Norbornene based resin - 3 | 310 | 175 | 150 | 130 | 180 | $1.8 \times 10^{-8}$ | 3.0~4.7 | 99.9 |
| Example 4 | Olefin-N-alkylmaleimide based resin | 245 | 140 | 120 | 100 | 155 | $1.1 \times 10^{-9}$ | 1.4~2.7 | 99.9 |
| Comparative Example 1 | Polycarbonate based resin | 285 | 140 | 120 | 100 | 170 | $6.3 \times 10^{-9}$ | 18.2~48.6 | 96.4 |

TABLE 2

(Table 2) Conditions

| | T1 (° C.) | T2 (° C.) | Difference of T1 and T2 | T3 (° C.) | Tp1 (° C.) | Tp2 (° C.) | Tp3 (° C.) | t1 (s) | R1 (m/min.) | R2 (m/min.) | R3 (m/min.) | R3/R2 | R2/R1 | Tg (° C.) | t1 × (Tp1-Tg) |
|---|---|---|---|---|---|---|---|---|---|---|---|---|---|---|---|
| Example 1 | 135 | 125 | 10 | 80 | 132 | 119 | 79 | 3.1 | 14.50 | 14.46 | 14.40 | 0.996 | 0.997 | 140 | −25 |
| Example 2 | 130 | 125 | 5 | 80 | 128 | 121 | 81 | 3.1 | 14.50 | 14.46 | 14.40 | 0.996 | 0.997 | 140 | −37 |
| Exmple 3 | 130 | 120 | 10 | 80 | 128 | 114 | 77 | 3.1 | 14.50 | 14.46 | 14.40 | 0.996 | 0.997 | 140 | −37 |
| Example 4 | 140 | 100 | 40 | 80 | 137 | 96 | 75 | 3.1 | 14.50 | 14.46 | 14.40 | 0.996 | 0.997 | 140 | −9 |
| Comparative Example 1 | 125 | 125 | 0 | 80 | 123 | 117 | 79 | 3.1 | 14.50 | 14.46 | 14.40 | 0.996 | 0.997 | 140 | −53 |
| Comparative Example 2 | 125 | 120 | 5 | 80 | 123 | 115 | 76 | 3.1 | 14.50 | 14.46 | 14.40 | 0.996 | 0.997 | 140 | −53 |
| Example 5 | 125 | 120 | 5 | 80 | 123 | 115 | 76 | 3.1 | 14.50 | 14.46 | 14.40 | 0.996 | 0.997 | 140 | −53 |

As shown in Table 1, the optical films of examples of the present invention have a small Z value comparing with those in the comparative examples, so that they are excellent in the whole light transmittance, polarization degree, color unevenness and color unevenness after a durability test. In the results of the examples 1 to 3 and 5, the maximum Re values are smaller than the result of the example 4, so that color unevenness and results of the simple liquid crystal display test are excellent. In the results of the examples 1 to 3, the Z values are smaller than those in the results of the examples 4 and 5, so that color unevenness after a durability test is excellent.

Next, a performance test in the case of performing stretch processing on the obtained optical film to obtain a phase difference film was conducted. The optical film obtained in the present invention can be made to be a phase difference film by performing stretch processing thereafter. A phase difference film is required to have a predetermined phase difference (retardation value), and the value has to be uniform. To examine performance of the optical film of the present invention as a phase difference film as a raw material film, a test below was conducted.

An obtained optical film obtained in the experiment was cut out to be a test piece (a width of 100 mm and a length of 150 mm), and the test piece was stretched at 140° C. by 1.1 to 2 times in the longitudinal direction at a speed of 100 mm/min. The stretching ratio was adjusted so that an average retardation becomes 275±10 nm. The retardation was measured by the same measurement method as that in the (2), and Re unevenness was obtained by dividing unevenness (difference between the maximum value and the minimum value) by an average value. The measurement points were at a center portion in the width direction and 10 points at every 10 mm near the center in the length direction.

Table 3 shows results of measuring Re unevenness after stretching in respective examples.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 3

(Table 3) Result of Re Unevenness Test after Stretching

| | Example 1 | Example 2 | Example 3 | Example 4 | Example 5 | Comparative Example 1 | Comparative Example 2 |
|---|---|---|---|---|---|---|---|
| Re Unevenness Test after Stretching (%) | 1.8 | 2.2 | 2.1 | 2.6 | 2.1 | 5.8 | 6.6 |

As shown in Table 3, the optical films of the examples of the present invention have smaller Z values than those in the case of comparative examples, so that retardation unevenness after stretch processing is small, which is excellent. Thus, the optical film of the present invention is suitable as a raw material film of a phase difference film.

INDUSTRIAL APPLICABILITY

An optical film with small optical distortion is provided by the present invention. The optical film of the present invention is useful as a variety of optical films of a flat panel display, such as a protective film of a polarizer and a liquid crystal cell substrate film. Also, the optical film of the present invention has small and uniform retardation, and it can be made to be a phase difference film having a predetermined uniform retardation by performing stretch processing after that. Therefore, the optical film of the present invention is useful as a raw material film of a phase difference film, etc.

The invention claimed is:

1. A production method of an optical film composed of a thermoplastic resin film, including a step of cooling a molten thermoplastic resin extruded from an extruding machine by making it successively circumscribed with a first cooling drum, a second cooling drum and a third cooling drum:

wherein, a temperature difference of said first cooling drum and said second cooling drum is made to be 10° C. or less to cool said thermoplastic resin, when, assuming a resin contact time in said first cooling drum is $t_1$ (sec.), a temperature when said thermoplastic resin moves away from said first cooling drum is $Tp_1$ (° C.), and a glass transition temperature of said thermoplastic resin is $Tg$ (° C.), the relationship:

$t_1 \times (Tp_1 - Tg)$ (unit: sec.·deg)

is made to be −50 or higher and 20 or lower to cool said thermoplastic resin, and said thermoplastic resin film satisfies a relation of the formula:

$[\sin^2 2\alpha] \times [\sin^2(\pi \cdot Re/550)] \leq 3.4 \times 10^{-5}$ over the whole surface of the film when an angle made by the extruding direction of the thermoplastic resin film from the melt extruding machine and a slow phase axis at each point is α and a retardation amount at each point is Re.

2. The production method of an optical film as set forth in claim 1, wherein, when assuming that rotation speed of said third cooling drum is $R_3$ (m/min.), and rotation speed of said second cooling drum is $R_2$ (m/min.), a ratio of the $R_3$ and $R_2$ ($R_3/R_2$) is made to be 0.990 or more but less than 0.999 to cool said thermoplastic resin.

3. The production method of an optical film as set forth in claim 1, wherein, when, assuming that rotation speed of said first cooling drum is $R_1$ (m/min.) and that rotation speed of said second cooling drum is $R_2$ (m/min.), a ratio of the $R_2$ and $R_1$ ($R_2/R_1$) is made to be 0.990 or more but less than 1.01 to cool said thermoplastic resin.

4. The production method of an optical film as set forth in claim 1, wherein, when, assuming that a temperature when said thermoplastic resin moves away from said third cooling drum is $Tp_3$ (° C.), the $Tp_3$ is made to be a lower temperature than a glass transition temperature of said thermoplastic resin Tg by 50 to 100° C. to cool said thermoplastic resin.

5. The production method of an optical film as set forth in claim 1, wherein, when, assuming that a temperature when said thermoplastic resin moves away from said second cooling drum is $Tp_2$ (° C.), the $Tp_2$ is made to be a lower temperature than a glass transition temperature of said thermoplastic resin Tg by 0 to 60° C. to cool said thermoplastic resin.

6. The production method of an optical film as set forth in claim 1, wherein said thermoplastic resin is an alicyclic structure containing polymer.

7. The production method of an optical film as set forth in claim 1, wherein a value of said Re is 10 nm or less.

* * * * *